(12) United States Patent
Linde et al.

(10) Patent No.: US 11,643,190 B2
(45) Date of Patent: May 9, 2023

(54) VORTEX GENERATOR APPARATUS FOR AN AIRCRAFT

(71) Applicant: Airbus Operations GmbH, Hamburg (DE)

(72) Inventors: Peter Linde, Hamburg (DE); Matthias Hegenbart, Hamburg (DE); Hermann Benthien, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 18 days.

(21) Appl. No.: 17/159,829

(22) Filed: Jan. 27, 2021

(65) Prior Publication Data

US 2021/0237859 A1 Aug. 5, 2021

(30) Foreign Application Priority Data

Jan. 30, 2020 (DE) .......................... 102020102327.8

(51) Int. Cl.
*B64C 23/06* (2006.01)
(52) U.S. Cl.
CPC .................................. *B64C 23/076* (2017.05)
(58) Field of Classification Search
CPC .............................. B64C 23/06; B64C 23/076
See application file for complete search history.

(56) References Cited

U.S. PATENT DOCUMENTS

| | | | | |
|---|---|---|---|---|
| 3,578,264 | A * | 5/1971 | Kuethe | F28F 1/32 181/220 |
| 7,878,457 | B2 * | 2/2011 | Narramore | B64C 23/06 244/200.1 |
| 9,090,326 | B2 * | 7/2015 | Whalen | B64C 23/005 |
| 9,422,954 | B2 * | 8/2016 | Van Buren | F15D 1/007 |
| 10,011,346 | B2 * | 7/2018 | Beckman | B64C 11/00 |
| 10,279,894 | B2 * | 5/2019 | Stefes | B64C 23/06 |
| 10,889,370 | B2 * | 1/2021 | Bushmire | B64C 27/22 |

(Continued)

FOREIGN PATENT DOCUMENTS

DE 102008006832 A1 8/2009

OTHER PUBLICATIONS

German Search Report; priority document.

*Primary Examiner* — Justin M Benedik
(74) *Attorney, Agent, or Firm* — Greer, Burns & Crain, Ltd.

(57) ABSTRACT

A vortex generator apparatus for an aircraft includes a surface section having a receiving recess, a vortex generator having a first edge, an opposite second edge and a vortex generator surface component extending from the first edge to the second edge, wherein the first edge is fixedly arranged in or adjacent to the receiving recess. The vortex generator surface component includes at least one electroactive polymer assembly, wherein the at least one electroactive polymer is switchable into an extended state by applying an electrical voltage and into a neutral state by removing the electrical voltage. The electroactive polymer assembly and the vortex generator surface component are configured to retract the vortex generator surface component completely into the receiving recess in the neutral state of the electroactive polymer assembly and to extend the vortex generator surface component from the receiving recess in the extended state.

13 Claims, 2 Drawing Sheets

(56) References Cited

U.S. PATENT DOCUMENTS

| | | | |
|---|---|---|---|
| 2005/0157893 A1* | 7/2005 | Pelrine | H04R 17/005 |
| | | | 381/190 |
| 2006/0027703 A1* | 2/2006 | Bussom | B64C 23/072 |
| | | | 244/17.13 |
| 2010/0018322 A1* | 1/2010 | Neitzke | B64C 3/38 |
| | | | 73/861.22 |
| 2010/0045752 A1* | 2/2010 | Xu | F15D 1/12 |
| | | | 347/68 |
| 2014/0238522 A1* | 8/2014 | Van Buren | B64C 21/10 |
| | | | 29/25.35 |

* cited by examiner

VORTEX GENERATOR APPARATUS FOR AN AIRCRAFT

CROSS-REFERENCES TO RELATED APPLICATIONS

This application claims the benefit of German patent application No. 102020102327.8 filed on Jan. 30, 2020, the entire disclosures of which are incorporated herein by way of reference.

FIELD OF THE INVENTION

The invention relates to a vortex generator apparatus for an aircraft, as well as an aircraft having at least one such vortex generator apparatus.

BACKGROUND OF THE INVENTION

Modern aircraft comprise a variety of movable or selectively activatable flow influencing elements for optimizing the aerodynamic characteristics of the aircraft. The majority of these are only used in dedicated flight phases outside cruise flight phases. For example, these include high lift systems having movable leading and trailing edge flow bodies.

In some aircraft, vortex generators are used for enhancing the air flow at certain positions and in certain situations. They generate vortices that impinge on a flow body, such as a tail plane or a movable element to influence a local flow behavior. However, as the vortices may also lead to a parasitic drag, they are usually retracted during cruise flight. This requires a dedicated mechanism for moving the respective vortex generators, which leads to an additional weight. Consequently, a trade off between a desired effect and a minimum weight is done.

SUMMARY OF THE INVENTION

It is thus an object of the invention to provide an alternative vortex generator for enhancing the aerodynamic characteristics of an aircraft, in particular of control surfaces or a tail plane, with a minimum weight.

A vortex generator apparatus for an aircraft is proposed, comprising a surface section having a receiving recess, a vortex generator having a first edge, an opposite second edge and a vortex generator surface component extending from the first edge to the second edge, wherein the first edge is fixedly arranged in or adjacent to the receiving recess, wherein the vortex generator surface component comprises at least one electroactive polymer assembly, wherein the at least one electroactive polymer is switchable into an extended state by applying an electrical voltage and into a neutral state by removing the electrical voltage, and wherein the electroactive polymer assembly and the vortex generator surface component are designed and configured to retract the vortex generator surface component completely into the receiving recess in the neutral state of the electroactive polymer assembly and to extend the vortex generator surface component from the receiving recess in the extended state.

The vortex generator unit according to the invention thus comprises three main components. The receiving recess is provided at the dedicated installation position of the vortex generator. As the vortex generator is used for influencing the air flow along and around the aircraft, the recess is arranged in an exterior skin of the aircraft, allowing the vortex generator to extend into the airflow.

The vortex generator surface component is arranged directly in or at the recess. It may comprise a shape that allows the influencing of a flow that passes the vortex generator surface component in a desired way. A main aim of the vortex generator unit is to provide a vortex or a series of vortices with a desired characteristic and intended for impinging on the flow body to influence the effect of the airflow onto the flow body. Hence, the shape and dimension of the vortex generator surface component depends on the intended function.

The vortex generator surface component may comprise an elastic material, such as a plastic foil with a certain thickness, which is selected based on the expected aerodynamic forces. By actuating the electroactive polymer assembly attached to it, the elastic material is flexed from the neutral state to the extended state.

The electroactive polymer thus acts as a drive unit or an actuator that bends the vortex generator surface component as required by applying a voltage. The electroactive polymer is capable of changing its shape by an external influence, such as the applied voltage. This may manifest itself in a bending, translational or rotational movement. A wide variety of electroactive polymers are known, which may essentially be divided into two different groups comprising ionic and electronic electroactive polymers. The mechanism of action of ionic electroactive polymers is based on ion diffusion, i.e., on mass transport. In electronic electroactive polymers, the change of shape is caused by electronic charge transport. Both groups may be divided into several subgroups. In the following, the ionic electroactive polymer is considered in particular, especially in the form of the IPMC actuator. The electroactive polymer can be realized, in particular, as a film or an arrangement of films that has a low density. Preferably, it may be arranged on a single side of the vortex generator surface component. Upon application of the voltage, it urges to increase its surface area, while its thickness decreases. For example, the electroactive polymer assembly is arranged on a side of the vortex generator surface component that faces the recess. If activated, the electroactive polymer assembly expands and bulges out to move the vortex generator surface component out of the recess.

The use of an electroactive polymer assembly to selectively extend the vortex generator surface component results in a hardly noticeable additional weight, which is particularly suitable for integration in a commercial aircraft. At the same time, however, a significant reduction in the amount of work required to produce the vortex generator is achieved.

Hence, by application of a voltage to the electroactive polymer assembly, it changes its shape. Through designing and configuring the electroactive polymeric assembly and the vortex generator surface component in a suitable way, the electroactive polymeric assembly is capable of extending the vortex generator surface component out of the recess and to retract it completely by removing the voltage.

A great advantage in this design lies in the reduction of required components for achieving the extension and retraction function. It is simply required to provide a voltage source and to control the voltage supply. A gear, a mechanical actuator or any other common mechanical means are not required for activating and deactivating the vortex generator. Due to the simple design, a very reliable function is provided. By providing a variable voltage or a voltage with a variable waveform, even the degree of extension can be influenced.

Still further, the use of an electroactive polymer assembly allows the retrieval of a feedback of the state of the vortex generator, since the electric characteristics of the electroactive polymeric assembly may change upon bending it. Thus, the vortex generator apparatus may also be subjected to a control.

According to an advantageous embodiment, the receiving recess is dimensioned to flushly receive the vortex generator surface component. Thus, the vortex generator surface component substantially fills the receiving recess completely. A gap between the vortex generator surface component and the recess is substantially eliminated in the retracted state and a substantially even surface is formed with the surrounding parts of the aircraft. Parasitic drag, particularly during cruise flight, is avoided.

It may also be advantageous if the vortex generator surface component comprises a predetermined bending region, which is positioned to allow the vortex generator surface component to flushly fit into the recess in the retracted state. The predetermined bending region allows the provision of an exactly defined bending behavior of the vortex generator surface component. For example, the predetermined bending region is arranged directly in a corner or delimiting edge of the recess, such that bending the component around the predetermined bending region leads to filling the receiving recess from one edge to an opposite edge of the recess. The predetermined bending region may be created by providing a weakened region or a kink. Still further, the vortex generator surface component may comprise a neutral shape that directly corresponds to the dimension of the recess. It may already be bent adjacent to the first edge. The first edge may extend perpendicular to a bottom surface of the recess and the vortex generator surface component extends parallel to the bottom surface in the neutral state. Thus, the component may bend around the kink.

Preferably, the vortex generator surface component is designed and configured to move about an angle of at least 45° between a retracted state to the extended state. Thus, the electroactive polymer assembly may be dimensioned to provide a sufficient force to provide such a substantial motion.

Still further, the vortex generator apparatus may comprise a voltage source and a control unit, such as a controller, wherein the control unit is adapted to selectively provide an electrical voltage from the voltage source to the electroactive polymer assembly. The voltage source may be a DC or an AC voltage source any may belong to an electric supply system on board of the respective aircraft. The control unit may be adapted for selectively providing an electrical voltage, which is adjusted to the requirements of the electroactive polymer assembly. For example, it may be capable of providing an electrical voltage of several kV.

It may be advantageous if the control unit is adapted to generate an AC voltage with a variable waveform as the electrical voltage. The waveform may include a rectangular waveform, a sine waveform, a triangular waveform or similar items for precisely controlling the electroactive polymer assembly. It may even be possible to provide a PWM voltage.

The vortex generator apparatus may further comprise a bending sensor arranged in the vortex generator surface component, wherein the bending sensor is adapted and configured to provide an electric signal that depends on the actual bending of the vortex generator surface component. The bending sensor provides a feedback to the control unit or a similar device, leading to influencing a control of the vortex generator surface component. For example, the electrical voltage may be changed, if the extension state of the vortex generator surface component is not satisfying.

The bending sensor may also comprise a separate electroactive polymer sensor, a strain gauge sensor or is provided by the electroactive polymer assembly. A separate electroactive polymer sensor provides a voltage signal that depends on the actual extension state. The strain gauge sensor provides an electric resistance that depends on the deformation. If the electroactive polymer assembly, which is used for extending the vortex generator surface component, is used for providing the bending sensor, the electrical signal may be superimposed onto the supply voltage and needs to be filtered out of a measured voltage at the control unit or the like.

It is preferred if the control unit is adapted to receive the electric signal, wherein the control unit is adapted to determine a bending degree of the electroactive polymer assembly from the received electric signal. As explained above, this allows to control the bending or extension action of the vortex generator surface component.

The control unit may be adapted to influence the electrical voltage depending on the bending degree and an external vortex generator deployment command.

The invention further relates to an aircraft comprising a fuselage, at least one flow body and at least one vortex generator arranged upstream of the at least one flow body. The flow body may be any element of the aircraft that is exposed to an airflow. This may include a vertical tail plane, a rudder, a wing, a horizontal tail plane, a movable flap and many other elements.

In an advantageous embodiment, the at least one flow body comprises a vertical tail plane. In an unlikely case of a single engine failure during takeoff or landing, a rudder attached to the vertical tail plane may be used for compensating a strongly asymmetric thrust. For this, a maximum deflection is required. In order to increase the efficiency of the rudder in this unlikely case, a vortex generator apparatus according to the above may positively influence the airflow that impinges onto the rudder to improve its efficiency.

Still further, the at least one flow body may comprise a movable flow body attached to the wing. This may, for example, comprise trailing edge flaps or the like.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION OF THE PREFERRED EMBODIMENTS

Figure 1:
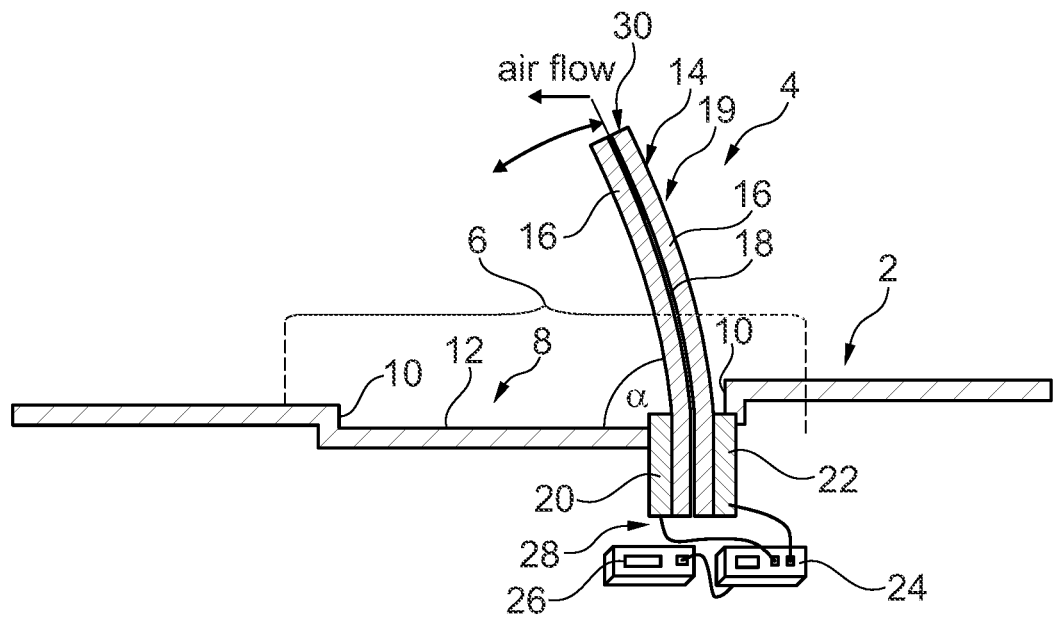
FIGS. 1 and 2 show a vortex generator apparatus in an extended state (FIG. 1) and in a retracted state (FIG. 2).

FIG. 1 shows an exterior surface 2 of an aircraft, which comprises a vortex generator apparatus 4. The vortex generator apparatus 4 comprises a surface section 6 having a receiving recess 8, which is delimited by opposed or circumferential edges 10 and a bottom surface 12.

Further, a vortex generator surface component 14 is present, which is exemplarily made from two foils 16 that enclose an additional layer 18 and comprises an electroactive polymer assembly 19. Here, the electroactive polymer assembly 19 is not a separate part, but is realized as an integrated function into the foils 16 and 18. It may particularly be bimorph.

Exemplary, the two foils 16 are made from an ionomer blend, such as PEDOT (poly(3,4-ethylenedioxythiophene)) and PSS (polystyrene sulfonate). However, other variants are possible and this example is not limiting the scope of protection. Layer 18 between both foils 16 is an insulator and may comprise a cationic polymer layer. The foils 16 are connected to a pair of electrodes, e.g., a cathode 20 and an anode 22. A control unit, such as a known controller 24, is connected to a voltage source 26 and to the electrodes 20 and 22. The control unit is capable of selectively applying a voltage to the electrodes 20 and 22, which leads to influencing the shape of the vortex generator surface component 14.

The vortex generator surface component 14 comprises a first edge 28, which is fixedly arranged in the bottom surface 12 directly at one of the edges 10. A second edge 30 is a free end. In FIG. 1 the component 14 is in an extended state and extends directly into a surrounding airflow by protruding from the bottom surface 12. This is conducted by an ion diffusion driven by an electric voltage supplied to the electrodes 20 and 22, which leads to different expansion and compression actions of the foils 16.

Figure 2:
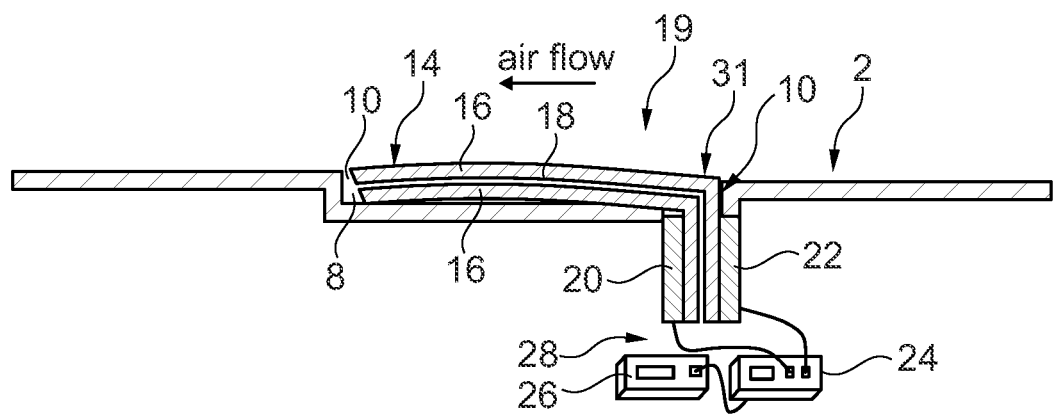
Figure 3:
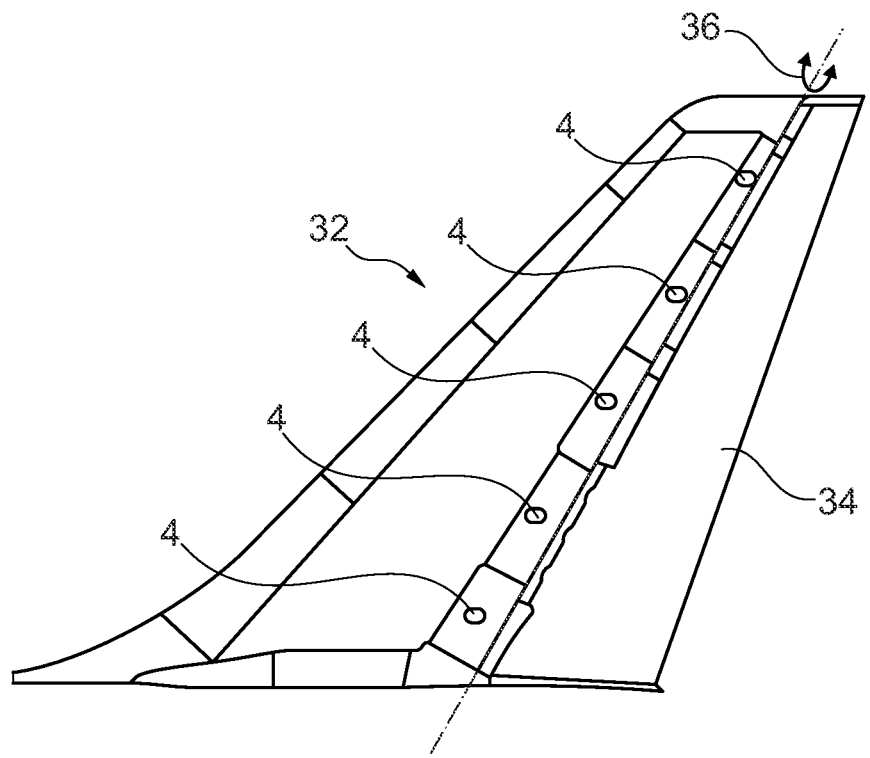
FIG. 3 shows a vertical tail plane with several vortex generator apparatuses upstream of a rudder.

In FIG. 2, the vortex generator surface component 14 is in a retracted state and flushly rests inside the recess 8. Hence, it fills the recess 8, such that the recess 8 is substantially closed and leads to a minimum parasitic drag. Here, the vortex generator surface component 14 comprises a predetermined bending region 31, which is positioned to allow the vortex generator surface component 14 to flushly fit into the recess 8 in the retracted state FIG. 3 shows a vertical tail plane 32, which comprises a rudder 34, which is swivelable about a swiveling axis 36. Directly upstream of the rudder 34, several vortex generator apparatuses 4 are provided. In the unlikely event of an asymmetric engine failure, the rudder 34 needs to be deflected about a comparably large angle around axis 36. This may lead to an undesired flow behavior. For this purpose, the vortex generator apparatuses 4 are provided to selectively create vortices that impinge onto the rudder 34, which increase its efficiency. Other installation positions are possible.

Figure 4:
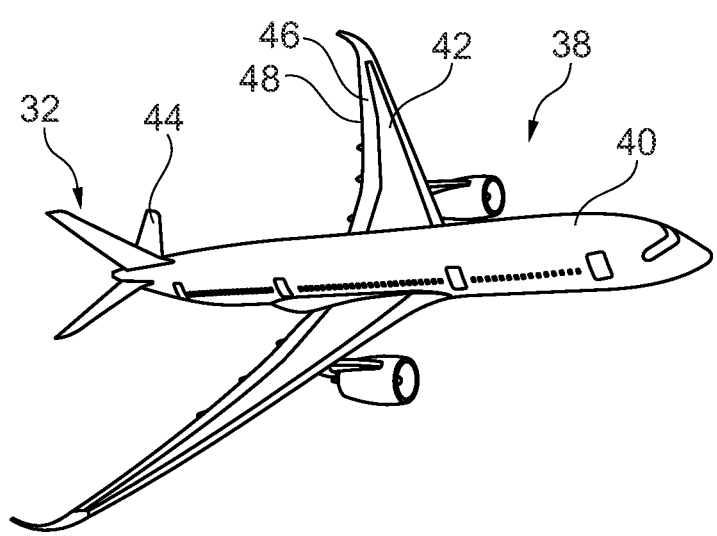
FIG. 4 shows an aircraft.

Finally, FIG. 4 shows an aircraft 38 having a fuselage 40, wings 42, horizontal tail planes 44 and the vertical tail plane 32 shown in FIG. 3. The wings 42 may comprise high lift systems, such as movable flaps 46 at a trailing edge 48, which may be supported by vortex generator apparatuses 4 arranged upstream of the trailing edge 48.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described with reference to one of the above exemplary embodiments may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 exterior surface
4 vortex generator apparatus
6 surface section
8 receiving recess
10 edge
12 bottom surface
14 vortex generator surface component
16 foil
18 additional layer
19 electroactive polymer assembly
20 cathode
22 anode
24 control unit
26 voltage source
28 first edge
30 second edge
31 predetermined bending region
32 vertical tail plane
34 rudder
36 rudder axis
38 aircraft
40 fuselage
42 wing
44 horizontal tail plane
46 movable flap
48 trailing edge

The invention claimed is:

1. A vortex generator apparatus for an aircraft, comprising:
   a surface section having a receiving recess,
   a vortex generator having a first edge, second edge and a vortex generator surface component extending from the first edge to the second edge,
   wherein the first edge is fixedly arranged in or adjacent to the receiving recess,
   wherein the vortex generator surface component comprises at least one electroactive polymer assembly comprising an electroactive polymer,
   wherein the at least one electroactive polymer assembly is switchable into an extended state by applying an electrical voltage and into a neutral state by removing the electrical voltage, and
   wherein the at least one electroactive polymer assembly and the vortex generator surface component are configured to retract the vortex generator surface component completely into the receiving recess in the neutral state of the at least one electroactive polymer assembly and to extend the vortex generator surface component from the receiving recess in the extended state, and
   wherein the electroactive polymer extends from the receiving recess in the extended state and retracts into the receiving recess in the neutral state.

2. The vortex generator apparatus of claim 1, wherein the receiving recess is dimensioned to flushly receive the vortex generator surface component.

3. The vortex generator apparatus of claim 1, wherein the vortex generator surface component comprises a predetermined bending region which is positioned to cause the vortex generator surface component to flushly fit into the recess in a retracted state.

4. The vortex generator apparatus of claim 1, wherein the vortex generator surface component is configured to move about an angle of at least 45° from a retracted state to the extended state.

5. The vortex generator apparatus of claim 1, further comprising a vortex generator actuator comprising a voltage source and a controller, wherein the controller is configured to selectively provide the electrical voltage from the voltage source to the at least one electroactive polymer assembly.

6. The vortex generator apparatus of claim 5, wherein the controller is configured to generate an AC voltage with a variable waveform as the electrical voltage.

7. The vortex generator apparatus of claim 1,
further comprising a bending sensor arranged in the vortex generator surface component, and
wherein the bending sensor is configured to provide an electric signal that depends on an actual bending of the vortex generator surface component.

8. The vortex generator apparatus of claim 7, wherein the bending sensor comprises a separate electroactive polymer sensor, a strain gauge sensor or is provided by the at least one electroactive polymer assembly.

9. The vortex generator apparatus of claim 5,
further comprising a bending sensor arranged in the vortex generator surface component,
wherein the bending sensor is configured to provide an electric signal that depends on an actual bending of the vortex generator surface component,
wherein the controller is configured to receive the electric signal, and
wherein the controller is configured to determine a bending degree of the at least one electroactive polymer assembly from the received electric signal.

10. The vortex generator apparatus of claim 9, wherein the controller is configured to influence the electrical voltage depending on the bending degree and an external vortex generator deployment command.

11. An aircraft, comprising:
a fuselage,
at least one flow body, and
at least one vortex generator apparatus arranged according to claim 1 upstream of the at least one flow body.

12. The aircraft according to claim 11, wherein the at least one flow body comprises a vertical tail plane.

13. The aircraft according to claim 11, wherein the at least one flow body comprises a movable flow body attached to the wing.

* * * * *